(12) United States Patent
Babineau et al.

(10) Patent No.: US 7,428,748 B2
(45) Date of Patent: Sep. 23, 2008

(54) METHOD AND SYSTEM FOR AUTHENTICATION IN A BUSINESS INTELLIGENCE SYSTEM

(75) Inventors: Vincent Joseph Babineau, Manotick (CA); Christian Legault, Nepean (CA); Leo Paul Cormier, Gloucester (CA); Marc Graveline, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/855,059

(22) Filed: May 27, 2004

(65) Prior Publication Data

US 2005/0278546 A1    Dec. 15, 2005

(51) Int. Cl.
*G06F 17/30* (2006.01)
(52) U.S. Cl. .................................. 726/5; 726/8; 726/3
(58) Field of Classification Search ................ 726/5, 726/6, 7, 3, 8
See application file for complete search history.

(56) References Cited

OTHER PUBLICATIONS http://www.cognos.com/, year 2007.*
http://en.wikipedia.org/wiki/Cognos, year 2007.*
https://accountservices.passport.net/ppnetworkhome.srf?vv=500&lc=1033, year 2007.*
UNIQuE: A User-Centric Framework for Network Identity Management Altmann, J.; Sampath, R.; Network Operations and Management Symposium, 2006. NOMS 2006. 10th IEEE/IFIP 0-0 0 pp. 495-506.*
Impostor: a single sign-on system for use from untrusted devices Pashalidis, A.; Mitchell, C.J.; Global Telecommunications Conference, 2004. GLOBECOM '04. IEEE vol. 4, Nov. 29-Dec. 3, 2004 pp. 2191-2195 vol. 4.*
Personal Brokerage of Web Sercvice Access Vassilev, A.T.; du Castel, B.; Ali, A.M.; Security & Privacy Magazine, IEEE vol. 5, Issue 5, Sep.-Oct. 2007 pp. 24-31.*

* cited by examiner

*Primary Examiner*—David Y Jung

(57) ABSTRACT

A system and method for permitting a user of a business intelligence reporting system to be authenticated against one or more logon IDs and concurrently using access rights associated with those logon IDs in a terminal session. The user in a single terminal session is allowed to access the system with one of the logon IDs, a first logon ID, which gives that user access rights to data sources (or authorities) related to the first logon ID. The user may then add or remove further access rights by logging on or off with subsequent logon IDs. Each subsequent logon ID gives that user additional access rights to data sources related to the subsequent logon IDs. No attempt is made to reduce the number or change the nature of these logon IDs.

20 Claims, 3 Drawing Sheets

METHOD AND SYSTEM FOR AUTHENTICATION IN A BUSINESS INTELLIGENCE SYSTEM

FIELD OF THE INVENTION

The invention is in the domain of the production of reports in a business intelligence system, and more specifically, in authenticating users in a business intelligence system.

BACKGROUND OF THE INVENTION

Reporting is the largest and fastest-growing component of the business intelligence (BI) market. The business intelligence systems of most companies have a wide spectrum of user classes and needs and often have several sources of data on which to base reports. It is therefore not unusual for a single user to use different usernames or logon IDs which give that user different rights and privileges of access to data within the system. Often such logon IDs are not related within the system.

Already the need to manage and deploy the identities of the end users, applications and devices involved with accessing applications is a considerable burden, since companies need to centrally manage and enforce security policy to comply with legislative and corporate governance initiatives.

Secure identity management can be described as the comprehensive management and administration of how identities are managed and used across complex, heterogeneous environments. How identities are managed includes all aspects of provisioning, authentication, and authorization for use inside the organization. In addition IT departments must securely manage access to the administration portal, keep user data private, and be easily audited for accountability. Even with a comprehensive secure identity management solution in place it is apparent that the elimination of any additional association of userids will please IT managers.

IT departments must be able to offer users their desired reporting capability without using too many computing resources. Any move to reduce the complexity of operation would be welcome, especially if it also represented a significant improvement in a service offered to users.

It is not unusual for users to protest the existence of such separate logon IDs, and for the system administrators with information technology (IT) departments to wish that fewer, rather than more, authentication systems were in existence within a corporation or business.

U.S. Pat. No. 6,643,782 Jin, et al. "Method for providing single step log-on access to a differentiated computer network"—issued Nov. 4, 2003, provides a method for providing single step log-on access for a subscriber to a computer network in which a Server intercepts and manipulates packets of data exchanged between a Network Access Server (NAS) and an Authentication Authorization and Accounting Server to obtain all the information it needs to automatically log the user on when the user logs on to the NAS. An authorized user is thus spared the task of having to re-enter username and password data or launch a separate application in order to gain secure access to private areas of the network. It does not however allow users to maintain more than one username each having specific access rights.

A white paper by Entrust Corp., "Opening the Door to e-Business: Balancing Return and Risk with Secure Identity Management" describes several of the challenges facing this domain. Netegrity Inc. have Site Minder product that is a security and management foundation for enterprise Web applications with a centralized security infrastructure for managing user authentication and access. However, neither of these addresses the issue identified above.

SUMMARY OF THE INVENTION

The present invention introduces a system and method for permitting a user to be authenticated against one or more logon IDs and concurrently using access rights associated with those logon IDs in a terminal session. The present invention allows the user in a single terminal session to access the system with one of the logon IDs, a first logon ID, which gives that user access rights (or authorities) related to the first logon ID, and then to add or remove further access rights to data sources by logging on or off with other logon IDs, subsequent logon IDs. Each subsequent logon ID gives that user additional access rights to data sources related to the subsequent logon IDs. No attempt is made to reduce the number or change the nature of these logon IDs. Rather the objective is to leave those aspects unchanged, at the same time giving the user a means of expanding and restricting the data access rights of the current terminal session as much as is required.

According to one aspect of the present invention there is provided a reporting method, for use in a business intelligence system having a report authoring application with a user interface, the method comprising the steps of accepting from a user credentials to generate a passport having access rights to data stored in the business intelligence system, accepting one or more subsequent credentials from a user at the same terminal to expand the access rights of the passport, accepting from a user definitions of reports to be generated by a query engine in collaboration with a report engine, the user definitions being at least partly based on the expanded access rights of the passport, and from the report definitions, generating reports for presentation to a user.

Accordingly the present invention does not make any changes to, or interfere with, the authentication processes themselves. Neither the management mechanisms nor the level of security, with or without encryption, for example, provided by these processes are changed.

The invention provides for the use of more than one existing logon IDs to create a union of data access rights that might otherwise require yet another logon ID. Therefore the present invention, by allowing multiple simultaneous authentications, provides users with the ability to request and produce reports containing the union of the data accessible by virtue of each authentication (its authority).

BRIEF DESCRIPTION OF THE DRAWINGS

Embodiments of the invention are described with reference to the following drawings.

DETAILED DESCRIPTION OF EMBODIMENTS OF THE INVENTION

Figure 1:
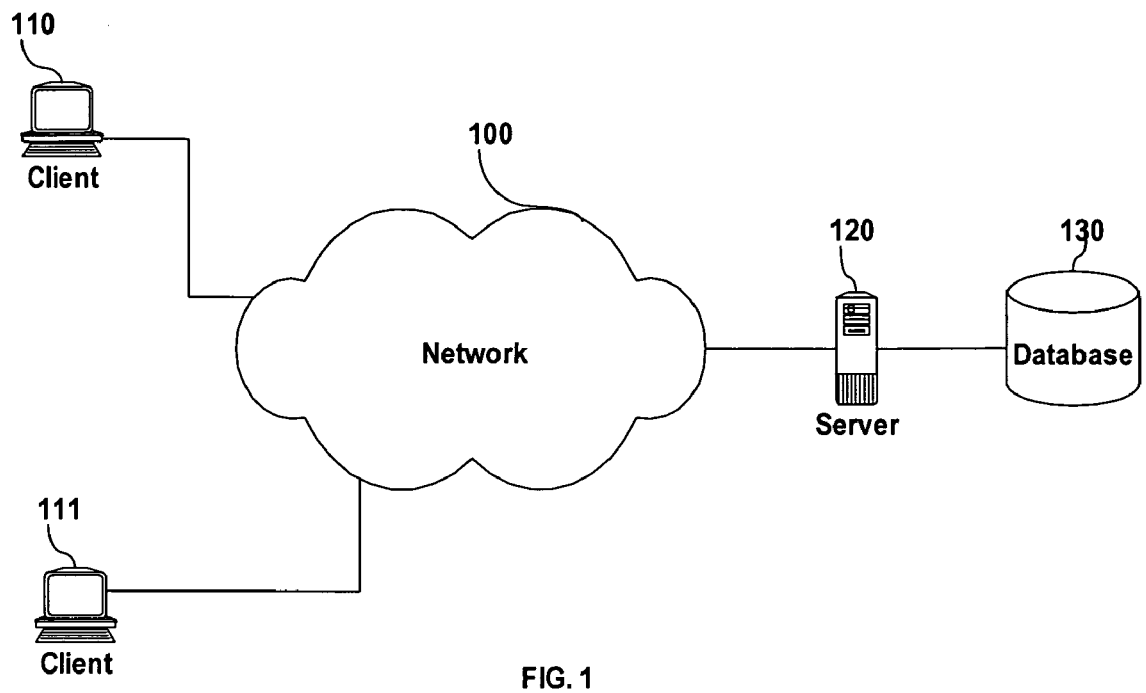
FIG. 1 illustrates a computer network suitable for embodiments of the present invention.

Logon ID, log-in ID, userID, username and similar terms are used synonymously, and we keep to the well-known meanings of the terms.

In describing the concepts behind the present invention, it is helpful to consider the following analogy. Travel documents for giving access rights to countries generally consist of a passport which defines who the holder is and their right to reside in a particular country (the issuing country). This passport also provides, informally, limited access rights to many other countries, although not all countries and not all possible access rights are provided. A further document, known as a visa, can provide extensions to these access rights outside of the passport issuing country. Visas are associated only with the holder of the passport, and allow extra rights to that holder in a specific country. More than one visa may be issued at a time, one for each of a number of countries, and the combination of passport and visa therefore give the passport holder a 'union' of each of the rights conveyed by the visas and the passport itself.

We next describe embodiments of the invention with reference to this analogy, recognizing that the analogy only refers to part of the overall invention. Therefore, in the following discussion the terms passport and visa are used in ways in closely related to the above analogy since it holds for certain aspects of the invention.

In embodiments of the invention, where a user has more than one logon ID and chooses to log on with more than one logon ID active, a terminal session is initiated when with the first logon is complete, and a passport is issued and a first visa recorded giving the user certain data access rights or authorities within the namespace associated with the logon ID. (A namespace is analogous to a country, the data access rights or authorities in this case being analogous to 'right of residence'). Subsequent logons from the same terminal in the same terminal session are accepted, but rather than issuing further passports, the rights or authorities imbued by these logons are recorded as subsequent visa entries within the passport structure. The passport is destroyed along with all recorded visas when the user ends the terminal session.

The use of visa entries on the passport permits the number of namespaces accessible during the terminal session to be expanded so that the data available (or visible) to the user is the union of the access rights for the namespaces of which the original logon and each of the subsequent logons are members.

In embodiments of the invention, the passport and associated visas are maintained in memory. The credentials and system for each of the logon IDs are maintained, for example, on one or more database servers for security, thereby making use of the standard operational features of such database servers for backup, maintenance and other required activities.

Unlike a passport in the real world that may be used for multiple sessions (trips), the 'passport' in embodiments of the invention differs in that it exists (or persists) only for a logon session, as determined by security and management rules outside the realm of the present discussion.

Also unlike the real world, it is possible for logon IDs from more one user to be associated as visas within the passport, provided that the log on actions all occur within the same terminal session.

Embodiments of the invention provide for access to more than one namespace within the database using only those usernames and associated passwords already in existence, relieving the user and system from the necessity of creating and maintaining yet another username/environment.

Within business intelligence reporting applications, user IDs are often assigned to be members of groups or to have roles. These groups or roles are used by the reporting application to grant particular access rights to that user ID.

Turning first to the FIG. 1 that shows a situation in which embodiments of the invention may be practised. The server 120 incorporates terminal session software (not shown), a query engine (not shown) and a report engine (not shown), has an associated database 130, which may be a data warehouse or similar data source, and is accessed over a network 100, such as the internet or an intranet, by a client computer 110. This client computer 110 is under the control of a report author (who is a user, not shown) and incorporates client terminal session software. It will be clear that other networks and communications media may be used, and that in some cases, the client and server elements may be geographically co-located, or may even be incorporated in the same hardware.

Figure 2:
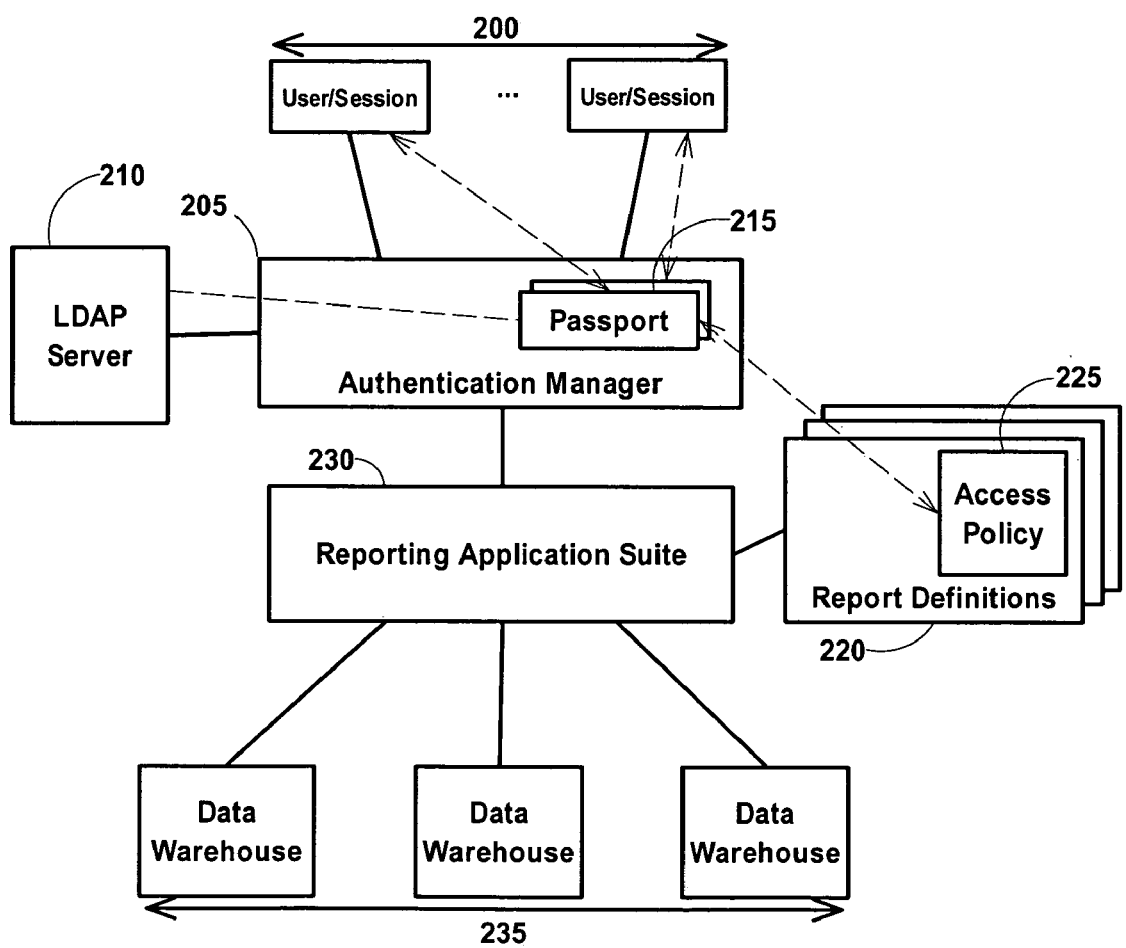
FIG. 2 is a representation of an embodiment of the invention.

FIG. 2 shows one embodiment of the invention in which two users, or rather user/sessions, are shown 200, communicating with an authentication manager 205 which it turn is able to communicate with a reporting application suite 230 and an LDAP server 210 or an equivalent authentication system such as those based on NTLM domains or Active Directories. (The Windows-NT™ Microsoft) LAN Manager—NTLM—is a Microsoft-proprietary protocol that authenticates users based on an authentication challenge and response. Active Directory is a directory service that enhances the operation of the directory structure by storing information about objects on a network. It then makes this information available to users and network administrators.) A number of passports 215 having visas (not shown) are maintained within the authentication manager 205. The passports, with any visas, contain information relating to users, namespaces, authentications, reports and memberships of groups or roles that define the current access rights of the user/session. The reporting application suite 230 has access to one or more data warehouses 235, each containing historical business data. The reporting application suite also produces, and has subsequent access to, a number of report definitions, 220, each containing an access policy 225. When a report definition is used to produce a report, the access policy 225 is compared to the access rights as determined by the user IDs and related data contained in a passport 215. This comparison determines what data a resulting report should contain.

When a user 200 initiates a terminal session, usually by attempting to logon with a credential such as a userID and password, the authentication manager 205 checks the credential supplied by the user using the Lightweight Directory Access Protocol (LDAP) Server 210. Once authentication has been successfully completed the authentication manager 205 creates a passport containing the credential 215 and a first visa (not shown) and passes the session to the reporting application suite 230. The user may then proceed to produce reports based on the authority given by the credential. The report definitions 220 associated with the reporting application suite 230 contain access policies 225 which are compared with the passport entry to determine whether the user has access to the report. The reports are then produced by reference to the one or more data warehouses or sources 235, and the results presented to the user 200. At any time after the first successful authentication, the user 200 may invoke a further logon, and the authentication manager 205 once again applies to the LDAP server 210 to check the new credentials. In these subsequent cases, once the authentication has been successfully completed, the information is added as a visa (see FIG. 3, 217, 218) to the passport 215 and the session is again passed to the reporting application suite 230. Thereafter, when access policies 225 are compared with the passport 215 during reporting activity, the union of the authorities of all of the visas within the passport is used, and reported data will be expanded. The passport ceases to exist once the user session ends. In some embodiments, the user logging off from the first userID, namely the one that caused the creation of the passport, determines the session end. Other triggers are possible and may be supported, including, but not limited to, expiration of timers based on activity, and explicit requests by the user to terminate the session.

Figure 3:
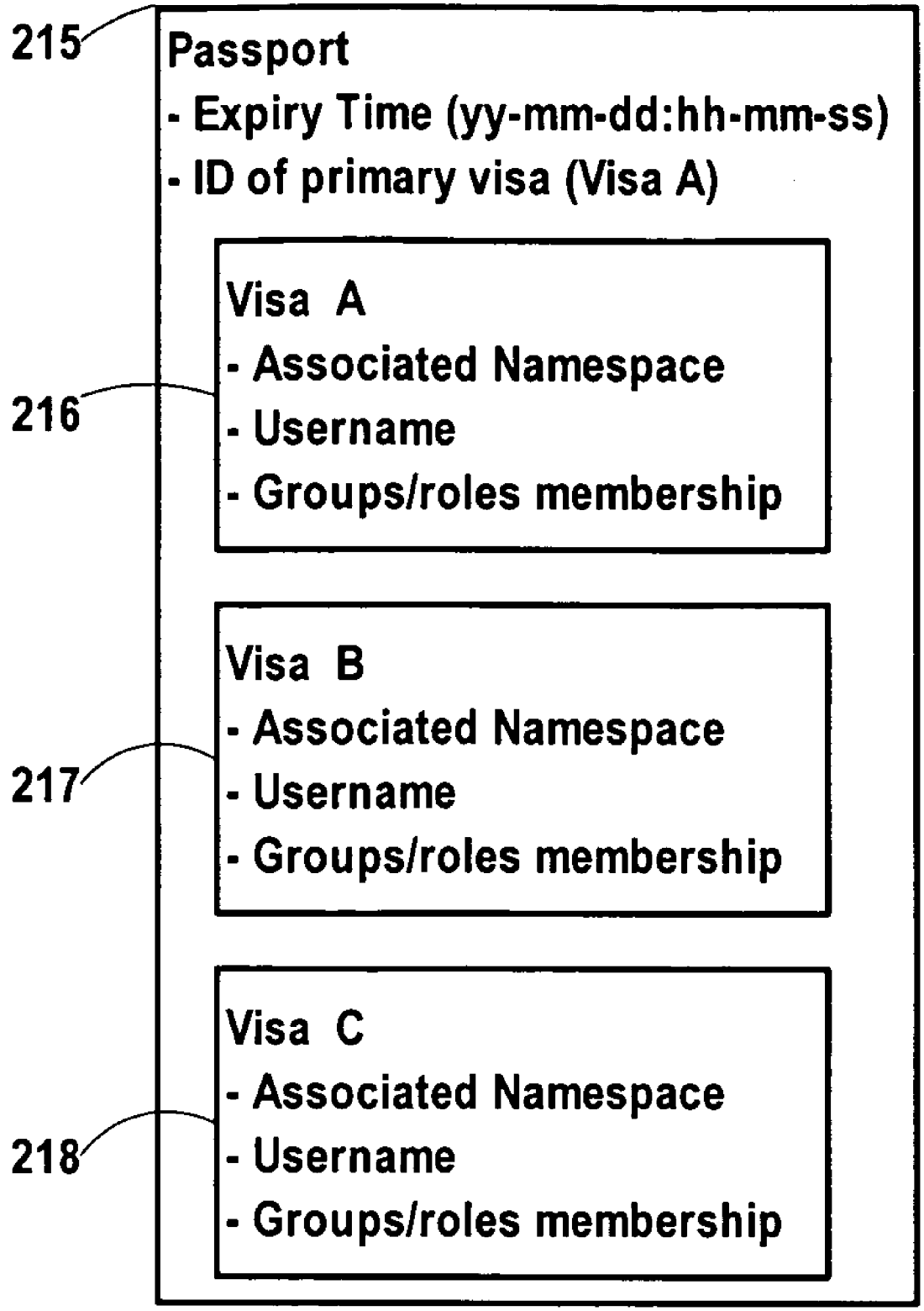
FIG. 3 shows a passport as provided for in embodiments of the invention.

In FIG. 3, an example of a passport 215 is shown having three visas. The passport contains, in addition to the visas, information such as the expiry time (in an appropriate format), and the identity of the primary or first visa, namely the one associated with the first logon. Other information may also be stored in the passport as required. Each of the visas 216, 217, 218 contains information related to the logons that instigated their creation. In this example, the associated namespace and username or user ID are recorded, and in addition the one or more groups or roles to which the username. It is these groups or roles that provide the information about what access rights are available to that user ID. Other information may also be stored in the visas as required. The access rights of the first visa A 216 are taken together with the access rights of the subsequent visas B 217, and C 218 so that the terminal session is imbued with the union of the access rights of visas A, B, and C.

Figure 4:
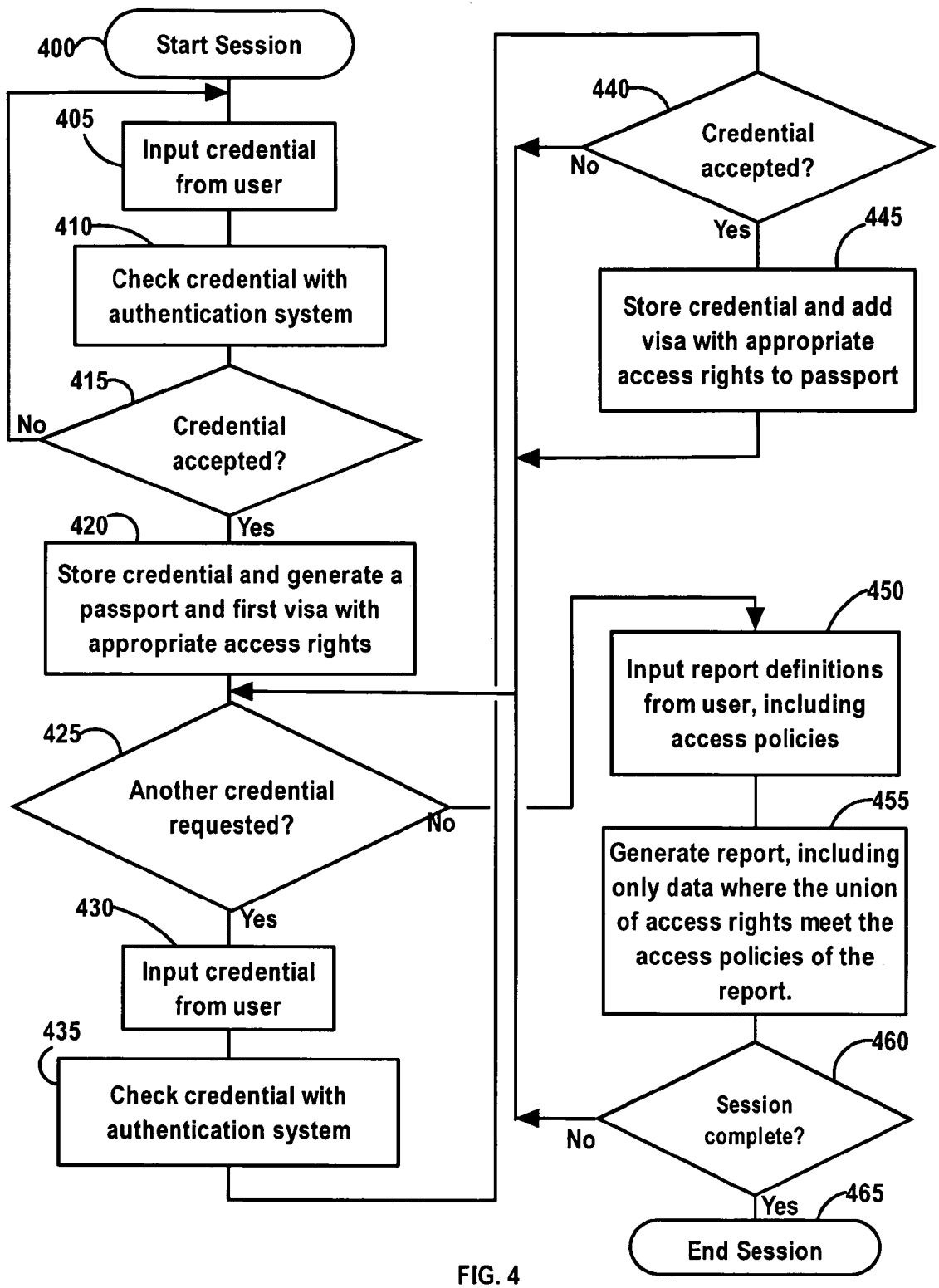
FIG. 4 is a simplified flowchart of an embodiment of the invention.

FIG. 4 shows a simplified flowchart of a suitable system in which embodiments of the invention may be used. Here, the session at a terminal is started 400, and the user provides a credential 405 for login to some associated system. The credential is checked with the authentication system 410 and if acceptable 415 is stored with the authentication system in the first visa of a passport, along with appropriate access rights 420. If the credential is unacceptable, the user may provide another credential 405 and the same process followed.

The user may at this point decide to add more credentials 425, and these are subsequently input 430, checked with the appropriate authentication system 435 and if deemed acceptable 440, the user may choose to proceed, or add yet more credentials 425. When the user decides sufficient credentials have been added and they are authenticated, report definitions are requested from the user 450, and the report generated, using only that data where the access rights of the session, being the union of the access rights imbued by all the visas in the passport, match the access policies of the report definition 455. When the report is completed, the user can decide 460 to terminate the session 465, or to add more credentials 425, and produce additional reports, proceeding as before.

In some embodiments, the user may selectively remove visas and the access rights of the terminal session are reduced accordingly.

Embodiments of the invention allow an administrator, who works for an application service provider (ASP) having multiple customers and whose authentication information is stored in several namespaces, to set up data that is viewable by users in all of the namespaces. To do this, the administrator creates an access control list (ACL) containing members from the various namespaces.

Other embodiments of the invention allow a company that is migrating from one security provider to another to transfer policies on secured objects. To do this the person doing the migration needs to authenticate to both security providers at the same time in order to include users from both namespaces.

Embodiments of the invention can be implemented in digital electronic circuitry or in computer hardware, firmware, and software or in combinations thereof. Apparatus of the present invention can be implemented in a computer program product tangibly embodied in a machine-readable storage device for execution by a programmable processor. The method of the present invention can be performed by a programmable processor executing a program of instructions to perform the functions of the invention by operating on input data and generating output.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method for presenting a report, for use in a business intelligence system having a report authoring application with a user interface capable of accepting user input during terminal sessions and having access to a data source, comprising the steps of:
   a) starting a terminal session by accepting from a user at a terminal a first credential defining an identity of the user;
   b) authenticating the first credential with an authentication system;
   c) storing the authenticated first credential, the first credential having an indication of access rights to the data source used by the business intelligence system;
   d) generating a passport and a first visa using the stored authenticated first credential;
   e) accepting a subsequent credential from the user in the same terminal session; and for the subsequent credential:
      i) authenticating the subsequent credential with the authentication system;
      ii) storing the authenticated subsequent credential, the subsequent credential having the indication of access rights to the data source used by the business intelligence system; and
      iii) creating within the passport a subsequent second visa with the indication of access rights to the data source;
   f) conferring to the terminal session the union of the access rights to the data source of the passport and the second visa;
   g) accepting from the user, report definitions to be generated by a query engine in collaboration with a report engine and the data source, the report definitions including access policies for the data to be used in producing a report;
   h) generating the report from the report definition; and
   i) presenting the report to the user, the report being at least partly based on the union of the access rights.

2. The method of claim 1 wherein each of the first credential and subsequent credential comprises one or more pieces of information, depending on authentication system requirements.

3. The method of claim 1 further comprising the steps of:
   i) returning a first token representing the first credential; and
   ii) storing the first token, the first token having the indication of access rights to data sources used by the business intelligence system.

4. The method of claim 1, further comprising the steps of: returning a subsequent token, and
ii) storing the subsequent token, the token having the indication of access rights to data sources used by the business intelligence system.

5. The method of claim 1 further comprising the steps of:
i) removing the subsequent visa under user control, and
ii) conferring to the terminal session the union of the access rights to the data source of the passport and any remaining visas.

6. The method of claim 1 further comprising the steps of:
i) logging out from the first user identity; and
ii) removing the passport and the subsequent visa from an authentication manager.

7. The method of claim 1, further comprising the step of creating an access control list containing members from various namespaces.

8. The method of claim 1, further comprising the steps of migrating from a first security provider to a second security provider, and authenticating the first security provider and the second security provider at the same time to include a plurality of users from a plurality of namespaces.

9. A report presentation system, for use in a business intelligence system having a report authoring application with a user interface capable of accepting user input during terminal sessions and having access to a data source, the system comprising:
a) means for starting a terminal session by accepting from a user at a terminal a first credential defining an identity of the user;
b) means for authenticating the first credential with an authentication system;
c) means for storing the authenticated first credential, the first credential having an indication of access rights to the data source used by the business intelligence system;
d) means for generating a passport and a first visa using the stored authenticated first credential;
e) means for accepting a subsequent credential from the user in the same terminal session;
f) means for authenticating each subsequent credential with the authentication system;
g) means for storing each authenticated subsequent credential, each subsequent credential having the indication of access rights to the data source used by the business intelligence system;
h) means for creating within the passport a second visa with the indication of access rights to data sources;
i) means for conferring to the terminal session the union of the access rights to the data source of the passport and the second visa;
j) means for accepting from the user, report definitions to be generated by a query engine in collaboration with a report engine and the data source, the report definitions including access policies for the data to be used in producing a report;
k) means for generating the report from the report definition; and
l) means for presenting the report to the user, the report being at least partly based on the union of the access rights.

10. The report presentation system of claim 9, wherein each of the first credential and subsequent credential comprises one or more pieces of information, depending on authentication system requirements.

11. The report presentation system of claim 9, further comprising: means for returning a first token representing the first credential; and means for storing the first token, the first token having the indication of access rights to data sources used by the business intelligence system.

12. The report presentation system of claim 9, further comprising: means for returning a subsequent token, and means for storing the subsequent token, the token having the indication of access rights to data sources used by the business intelligence system.

13. The report presentation system of claim 9, further comprising: means for removing the subsequent visa under user control, and means for conferring to the terminal session the union of the access rights to the data source of the passport and any remaining visas.

14. A storage medium readable by a computer encoding a computer program for execution by the computer to carry out a method for presenting a report, for use in a business intelligence system having a report authoring application with a user interface capable of accepting user input during terminal sessions and having access to a data source, the computer program comprising:
code means for starting a terminal session by accepting from a user at a terminal a first credential defining an identity of the user;
code means for authenticating the first credential with an authentication system;
code means for storing the authenticated first credential, the first credential having an indication of access rights to the data source used by the business intelligence system;
code means for generating a passport and a first visa using the stored authenticated first credential;
code means for accepting a subsequent credential from the user in the same terminal session;
code means for authenticating each subsequent credential with the authentication system;
code means for storing each authenticated subsequent credential, each subsequent credential having the indication of access rights to the data source used by the business intelligence system;
code means for creating within the passport a second visa with the indication of access rights to data sources;
code means for conferring to the terminal session the union of the access rights to the data source of the passport and the second visa;
code means for accepting from the user, report definitions to be generated by a query engine in collaboration with a report engine and the data source, the report definitions including access policies for the data to be used in producing a report;
code means for generating the report from the report definition; and
code means for presenting the report to the user, the report being at least partly based on the union of the access rights.

15. The storage medium of claim 14, wherein each of the first credential and subsequent credential comprises one or more pieces of information, depending on authentication system requirements.

16. The storage medium of claim 14, further comprising:
code means for returning a first token representing the first credential; and code means for storing the first token, the first token having the indication of access rights to data sources used by the business intelligence system.

17. The storage medium of claim 14, further comprising:
code means for returning a subsequent token, and code means for storing the subsequent token, the token having the indication of access rights to data sources used by the business intelligence system.

18. The storage medium of claim 14, further comprising:
code means for removing the subsequent visa under user control, and code means for conferring to the terminal session the union of the access rights to the data source of the passport and any remaining visas.

19. The storage medium of claim 14, further comprising code means for creating an access control list containing members from various namespaces.

20. The storage medium of claim 14, further comprising code means for migrating from a first security provider to a second security provider, and code means for authenticating the first security provider and the second security provider at the same time to include a plurality of users from a plurality of namespaces.

* * * * *